United States Patent [19]

Atsuumi et al.

[11] Patent Number: 4,903,483
[45] Date of Patent: Feb. 27, 1990

[54] EXHAUST SYSTEM FOR V-TYPE ENGINE

[75] Inventors: Mamoru Atsuumi; Yorio Futakuchi; Hiroyuki Kosugi, all of Iwata, Japan

[73] Assignee: Yamaha Hatsudoki Kabushiki Kaisha, Iwata, Japan

[21] Appl. No.: 311,637

[22] Filed: Feb. 16, 1989

[30] Foreign Application Priority Data

Feb. 17, 1988 [JP] Japan .................................. 63-35329
Feb. 19, 1988 [JP] Japan .................................. 63-32850

[51] Int. Cl.⁴ .............................................. F01N 7/10
[52] U.S. Cl. ...................................... 60/313; 180/219; 180/309
[58] Field of Search ................. 60/313; 180/219, 89.2, 180/296, 309

[56] References Cited

U.S. PATENT DOCUMENTS

| 4,454,714 | 6/1984 | Ikenoya | 60/293 |
| 4,699,232 | 10/1987 | Nebu | 180/309 |
| 4,795,420 | 1/1989 | Sakurai | 180/309 |
| 4,809,800 | 3/1989 | Suzuki | 180/309 |

FOREIGN PATENT DOCUMENTS

224812 12/1983 Japan .................................. 180/309

Primary Examiner—Douglas Hart
Attorney, Agent, or Firm—Ernest A. Beutler

[57] ABSTRACT

Two embodiments of motorcycles having improved exhaust systems. In each embodiment, the motorcycle includes a V-type engine and the exhaust system provides substantially equal length exhaust pipes that merge into a common exhaust outlet and which are disposed beneath the clutch and on the opposite side of the engine from the generator. In addition, one embodiment discloses an oil filter that is disposed above the clutch so as to be protected from the heat of the exhaust pipes by the clutch.

28 Claims, 8 Drawing Sheets

EXHAUST SYSTEM FOR V-TYPE ENGINE

BACKGROUND OF THE INVENTION

This invention relates to an exhaust system for a V-type engine and more particularly to an improved, simplified and compact exhaust system for such engines.

As is well known, many types of engines have angularly disposed cylinders. This is common practice in V-type engines or the like as are employed to power motorcycles. When a V-type engine is employed, it is desirable to provide an exhaust system for the exhaust ports of the individual cylinders that has a common exhaust gas discharge to the atmosphere for tuning purposes. However, when the engine is placed in a vehicle such as motorcycle with the cylinders in a fore and aft arrangement, it is difficult to provide a proper exhaust system.

One reason why there are problems in designing the exhaust system for such applications is that it is desirable that the length of the individual exhaust pipes from the exhaust ports to their common discharge have the same length. Because of the fore and aft disposition of the cylinders, this is a problem with certain applications such as motorcycles.

It is, therefore, a principal object of this invention to provide an improved exhaust system for a V-type engine wherein there is a common exhaust gas discharge and the exhaust pipes leading to it have substantially the same length.

Normally with motorcycle applications as well as many other applications, the exhaust pipes for the individual cylinders pass beneath the crankcase of the engine. This gives rise to certain additional design problems including the aforenoted difficulty of maintaining the same length for the individual exhaust pipes. In addition, frequently accessories are driven by the crankshaft and it is desirable to insure that these accessories are not heated by the exhaust pipes.

It is, therefore, still a further object of this invention to provide an improved arrangement for the exhaust system of an engine wherein the exhaust pipes are disposed so that they will not heat accessories which are driven by the engine.

It is a further object of this invention to provide an improved exhaust system for a motorcycle having crankshaft driven accessories that are located remotely from the exhaust system.

SUMMARY OF THE INVENTION

A first feature of this invention is adapted to be embodied in an exhaust system for an engine that has a crankshaft and at least a pair of cylinders that extend from the crankcase at an angle to each other. These cylinders are staggered transversely of the crankcase so that one of the cylinders is offset relative to the other of the cylinders. The cylinders have like facing exhaust ports. In accordance with the invention, a first exhaust pipe extends from the exhaust port of the offset cylinder downwardly and to one side of the other of the cylinders and passes at least in part under the crankcase. A second exhaust pipe extends from the exhaust port of the other cylinder and passes at least in part beneath the crankcase and a common atmospheric exhaust gas discharge is provided for the exhaust pipes.

Another feature of the invention is also adapted to be embodied in an exhaust system for an engine having a crankcase and an accessory driven by a crankshaft supported within the crankcase and disposed at one side of the crankcase. The engine has a pair of cylinders that extend from the crankcase at an angle to each other. The cylinders have like facing exhaust ports and in accordance with this feature of the invention, first and second exhaust pipes extend from the exhaust ports of the cylinders downwardly and at least in part beneath the crankcase. The exhaust pipes are offset to one side of the crankcase, this being the side opposite to that where the accessory is located.

Yet another feature of the invention is adapted to be embodied in an exhaust system for an engine that has a crankcase containing a crankshaft and a clutch driven from the crankshaft at one side of the crankcase. A pair of cylinders extend from the crankcase at an angle to each other and these cylinders have like facing exhaust ports. In accordance with the invention, the exhaust system comprises first and second exhaust pipes that extend from the exhaust ports of the respective cylinders downwardly and pass at least in part beneath the crankcase and specifically beneath the clutch.

DETAILED DESCRIPTION OF THE PREFERRED EMBODIMENTS OF THE INVENTION

Figure 1:
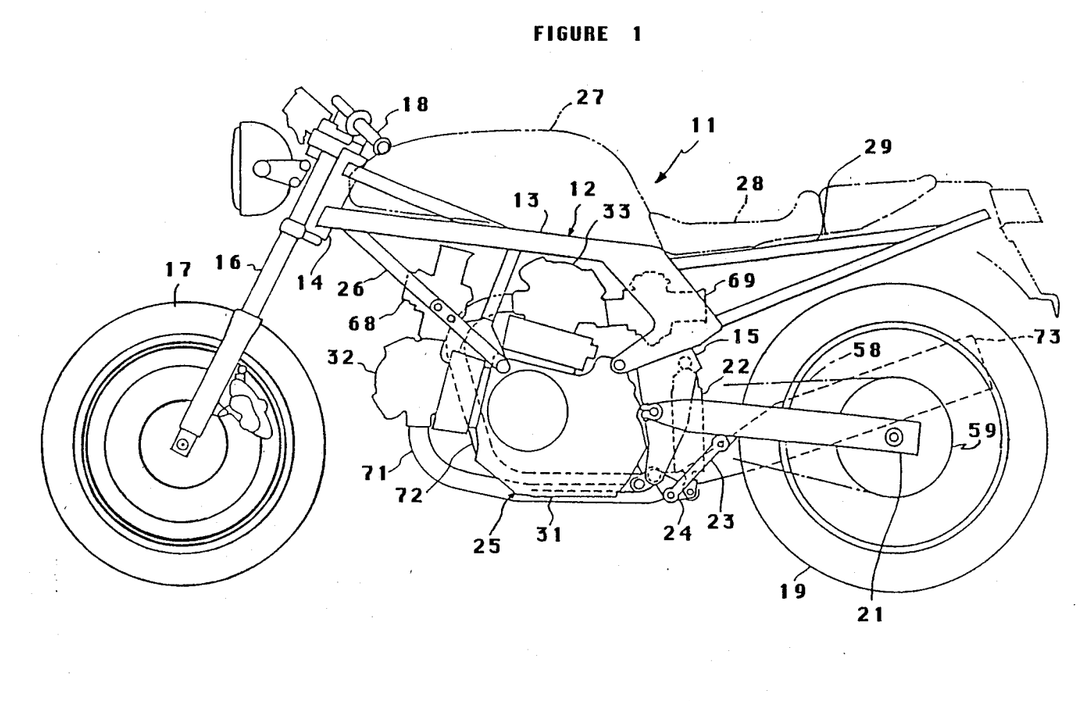
FIG. 1 is a side elevational view of a motorcycle constructed in accordance with a first embodiment of the invention.
Figure 5:
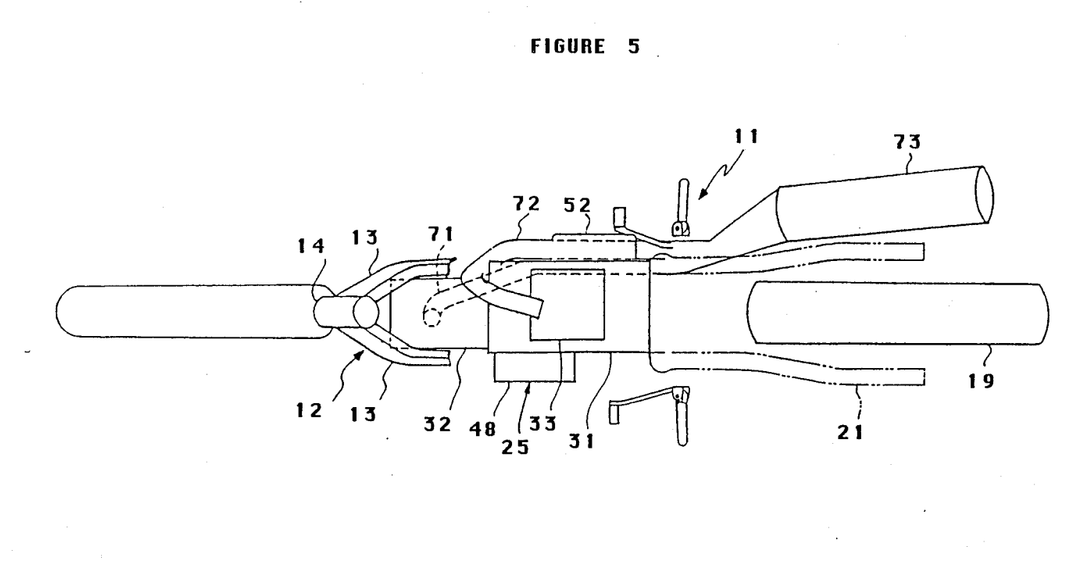
FIG. 5 is a top plan view of the motorcycle of this embodiment.

Referring first to FIGS. 1 and 5, a motorcycle constructed in accordance with a first embodiment of the invention is identified generally by the reference numeral 11. The motorcycle 11 is comprised fo a frame assembly 12, which may be of any known type and which includes main frame members 13 that extend rearwardly from a head pipe 14 and which are connected to a frame casting 15 at their rear ends. A front fork assembly 16 is journaled by the head pipe 14 and carries a front wheel 17 that is steered by a handlebar assembly 18 in a known manner.

A rear wheel 19 is journaled at the rear end of a trailing arm assembly 21 that is pivotally supported on the frame in a known manner. The rear wheel 19 and trailing arm 21 are suspended by means of a suspension assembly including a shock absorber 22 that is loaded by means of a linkage system comprised of links 23 and 24.

A power unit in the form of a combined engine/transmission assembly, indicated generally by the reference numeral 25, is suspended within the frame 12 in a suitable manner by means including a down pipe 26 of the frame assembly 12. A fuel tank 27 (shown in phantom) is supported on the frame assembly 12 in a known manner behind the head pipe 14. A seat 28, also shown in phantom, is supported to the rear of the fuel tank 27 on a seat rail 29 of the frame assembly. It should be understood that the construction of the motorcycle 11 as thus far described may be considered to be conventional and the construction of the motorcycle per se forms no part of the invention. For that reason, further details of the construction of the motorcycle are not believed to be necessary to understand the invention.

Figure 2:
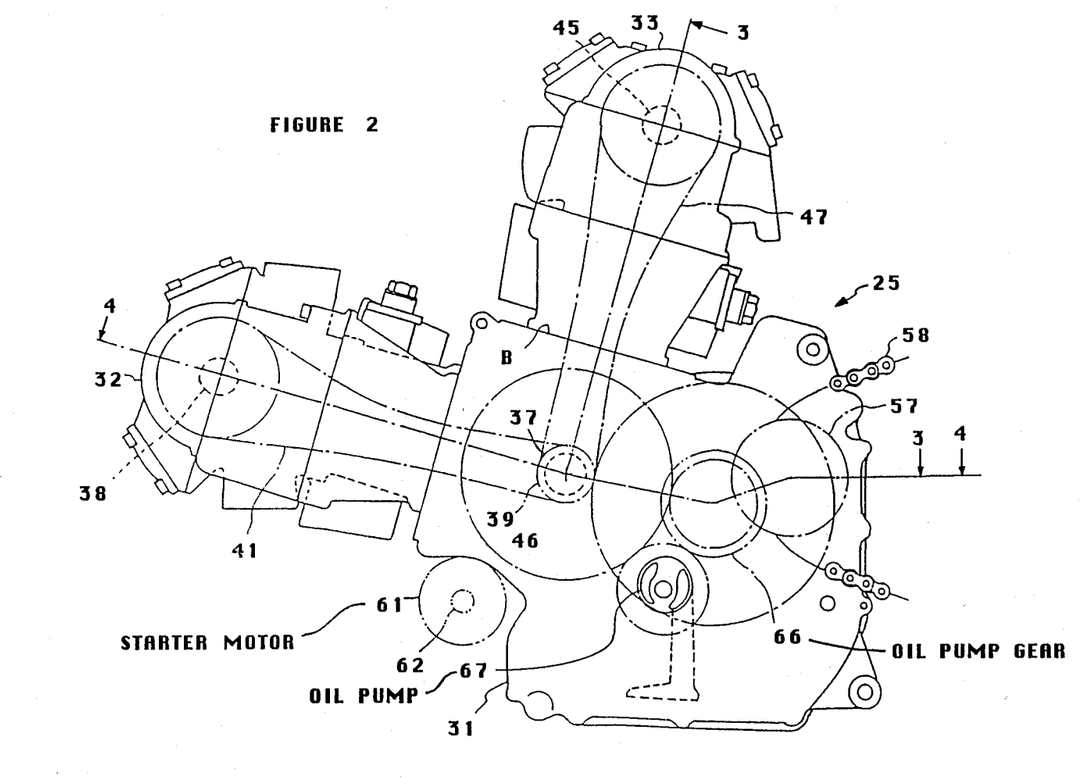
FIG. 2 is an enlarged side elevational view of the power unit of the motorcycle.
Figure 3:
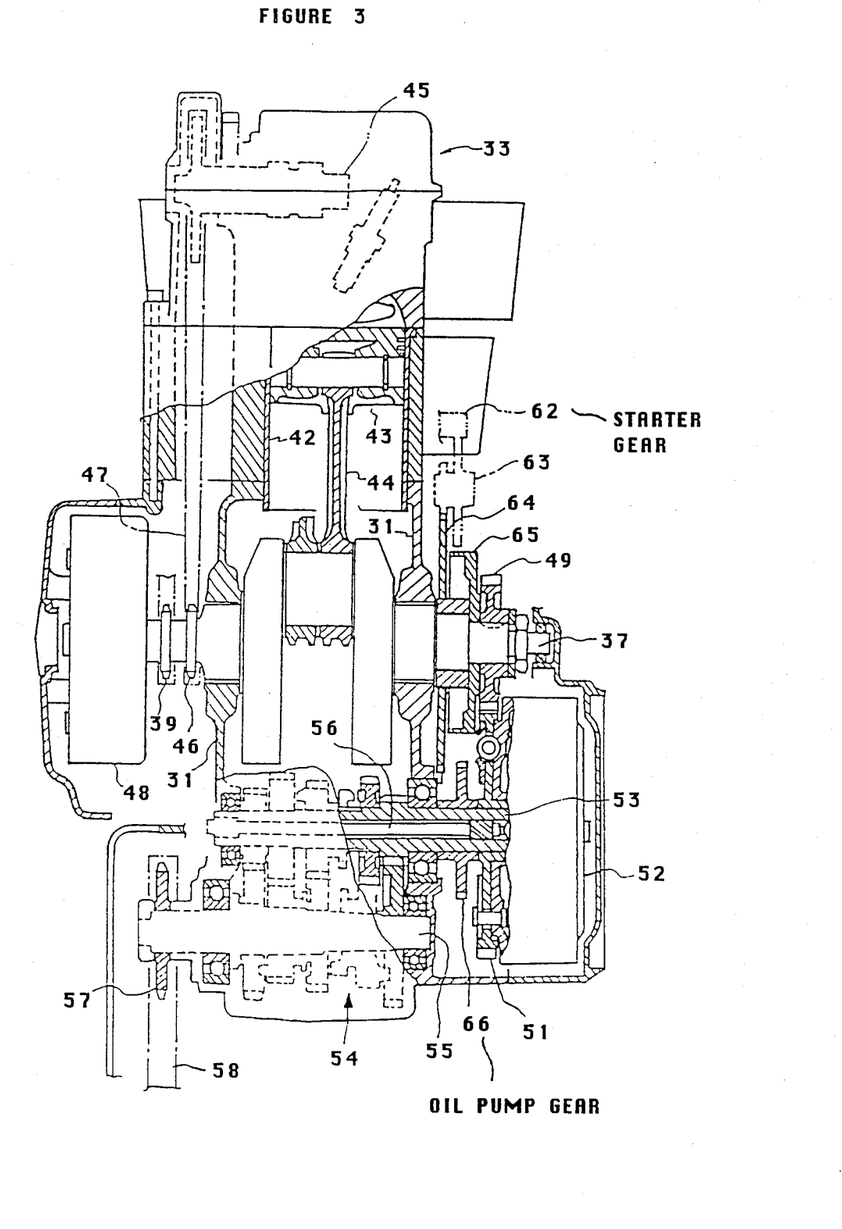
FIG. 3 is a cross-sectional view taken generally along the line 3—3 of FIG. 2.
Figure 4:
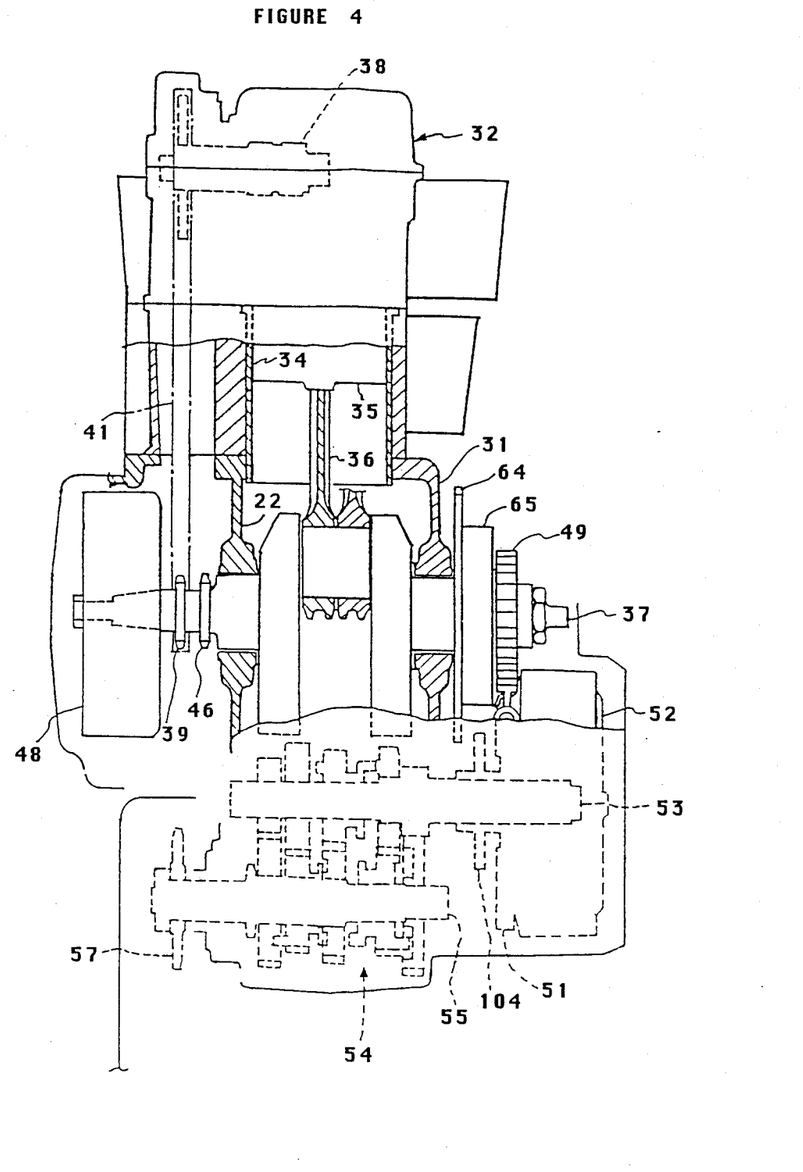
FIG. 4 is a cross-sectional view taken generally along the line 4—4 of FIG. 2.

Referring now in detail additionally to FIGS. 2 through 4, the power unit 25 is comprised of an internal combustion engine that has a combined crankcase/transmission assembly 31. In the illustrated embodiment, the engine is of the V-2 type and includes a forwardly facing cylinder bank 32 and a generally upstanding cylinder bank 33. The cylinder banks 32 and 33 are disposed at a right angle to each other. Although the invention is described in conjunction with a V-2 type of engine, it is to be understood that the invention may be utilized in conjunction with engines having other than two cylinders and engines in which the cylinder banks are disposed at angles other than right angles to each other. However, the invention has particular utility in conjunction with engines wherein the cylinder banks are disposed so that one extends in a generally forward direction and the other extends rearwardly of that forwardly disposed cylinder.

As may be best seen in FIG. 4, the forward cylinder bank 32 is formed with a cylinder liner 34 that defines a cylinder bore in which a piston 35 reciprocates. A connecting rod 36 interconnects the piston 35 to a crankshaft 37 that is journaled within the crankcase 31 in a known manner. The cylinder bank 32 has a cylinder head that carries a valve mechanism (not shown) that is operated by means of an overhead mounted camshaft 38 that is driven from a sprocket 39 formed at one end of the crankshaft 37 by means of a timing chains or belt 41.

Referring now to FIG. 3, the rear cylinder bank 33 is provided with a cylinder liner 42 that defines a cylinder bore in which a piston 43 is supported for reciprocation. The piston 43 is connected to the same throw of the crankshaft 37 as the piston 35 by means of a connecting rod 44. It should be noted that because of the offset of the connecting rods 36 and 44, the cylinder banks 32 and 33 are offset relative to each other with the rearmost cylinder bank 33 being offset to the right as viewed in FIG. 5 from the cylinder bank 32.

The cylinder head of the cylinder bank 33 is provided with a valve train (not shown) that is operated by means of an overhead camshaft 45 in a known manner. The camshaft 45 is driven from a timing sprocket 46 of the crankshaft 37 by means of a belt or chain 47. The chains 41 and 47 are also offset by the stagger of the cylinder bores of the cylinder banks 32 and 33.

A magneto generator 48 is driven directly from the crankshaft 37 and is offset to the end of the crankshaft 37 to which the cylinder bank 32 is closest. That is, the cylinder bank 33 is offset farther from the magneto generator 48 than is the cylinder bank 32.

A transfer gear 49 is affixed to the opposite end of the crankshaft 37 and drives an input gear 51 that is connected to the driving plate of a clutch mechanism, indicated generally by the reference numeral 52. The output element of the clutch mechanism 52 is connected to a primary or input shaft 53 of a change speed transmission, indicated generally by the reference numeral 54. The change speed transmission 54 includes a plurality of pairs of intermeshing gears that are carried by the primary shaft 53 and a secondary shaft 55 that is journaled for rotation about an axis parallel to the axes of the crankshaft 37 and primary shaft 53. The selective engagement and disengagement of the change speed gears for selecting the transmission ratios at which the secondary shaft 55 is driven is controlled by means of a shift rod 56 that is journaled within the primary shaft 53 and which is operated in a known manner.

An output sprocket 57 is affixed to the end of the secondary shaft 55 opposite to the clutch 52. A chain 58 is trained around the sprocket 57 and drives the rear wheel by means of a sprocket 59 (FIG. 1) that is affixed for rotation with the rear wheel 19 in a known manner.

An electrically operated starter motor 61 is positioned beneath the crankcase transmission assembly 31 below the forwardmost cylinder bank 32. The starter motor 61 drives a starter gear 62 that is affixed to the clutch end of the starter motor 61 and which gear 62 drives an idler gear 63 (FIG. 3). The idler gear 63 meshes with a starting gear 64 that is adapted to be coupled to the crankshaft 37 through a one-way clutch 65 for starting in a known manner.

An oil pump drive gear 66 is affixed to the input gear 51 of the clutch mechanism 52 in a known manner and rives an oil pump 67 that is contained within the crankcase for lubricating the engine in a suitable manner.

Referring again primarily to FIGS. 1 and 5, it should be noted that each of the cylinder banks 32 and 33 has a generally rearwardly opening intake port. A carburetor 68 supplies a fuel/air mixture to the intake port of the cylinder bank 32. It should be noted that because of the generally horizontal disposition of the cylinder bank 32 the rearwardly facing intake port also opens generally upwardly. In a like manner, a carburetor 69 cooperates with the intake port of the cylinder bank 33 for supplying a fuel/air mixture to it.

In accordance with the invention, the power unit 25 is provided with an exhaust system. This exhaust system delivers exhaust gases from the forwardly facing exhaust ports of the cylinder banks 32 and 33 to the atmosphere. For this purpose, a first exhaust pipe 71 extends downwardly from the exhaust port of the cylinder bank 32 and toward the side of the power unit 25 that is disposed opposite to the magneto generator 48. The exhaust pipe 71 extends toward the offset cylinder bank 33 and passes beneath the clutch 52 and a portion of the crankcase transmission assembly 31.

An exhaust pipe 72 extends forwardly and then downwardly from the exhaust port of the cylinder bank 33 and passes along the side of the cylinder bank 32 adjacent the clutch side 52. Because of this configuration, it is possible to maintain the exhaust pipe 71 and 72 of substantially the same length even though the exhaust ports from which they emanate are disposed at different locations. The exhaust pipes 71 and 72 merge into a combined muffler tailpipe assembly 73 that is disposed on one side of the motorcycle and on one side of the rear wheel 19 for discharge of the exhaust gases to the atmosphere. As a result, the configuration is such that the exhaust pipes have substantially the same length and also a minimum number of bends and no sharp curves. This provides a very efficient exhaust system and one that may be easily tuned.

Figure 6:
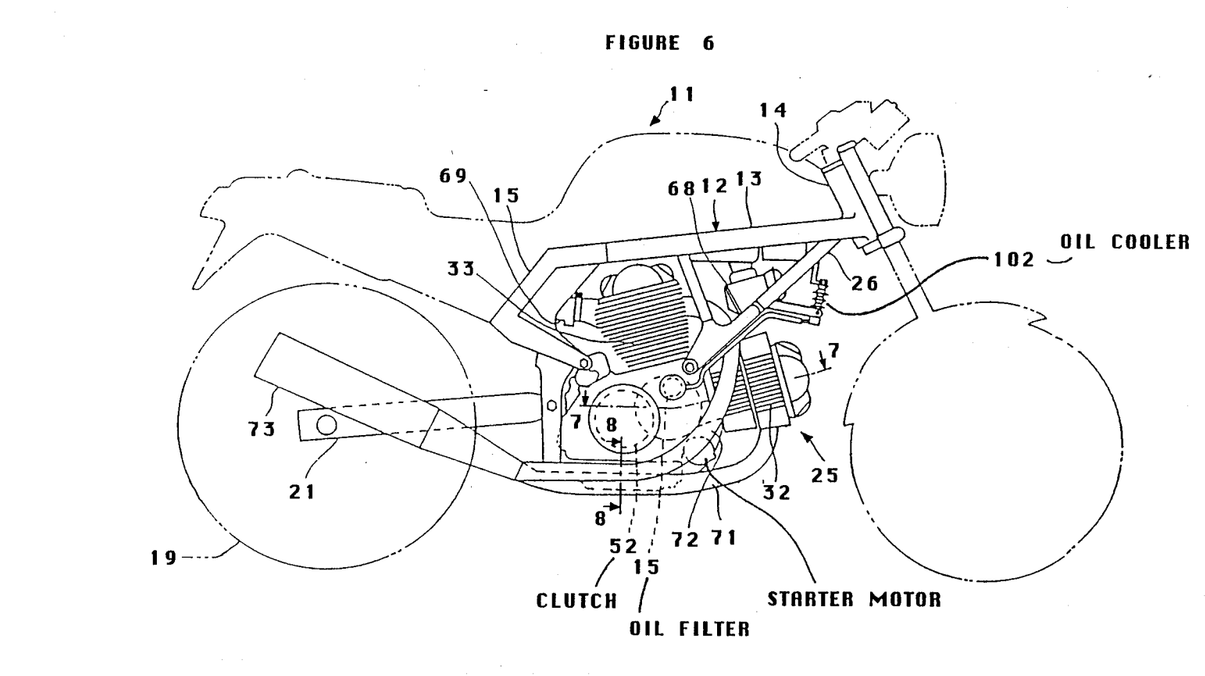
FIG. 6 is a side elevational view, of a motorcycle constructed in accordance with a second embodiment of the invention and looking from the side opposite to the side of the motorcycle shown in FIG. 1.
Figure 7:
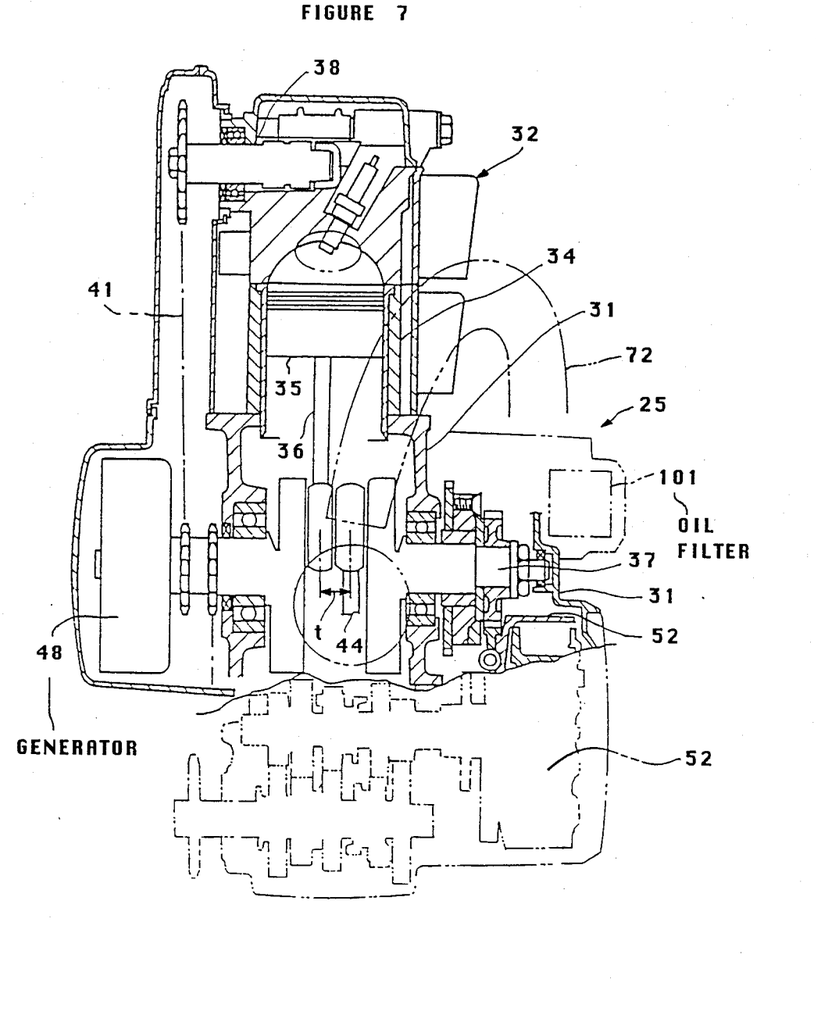
FIG. 7 is a cross-sectional view, on an enlarged scale, taken generally along the line 7—7 of FIG. 6.
Figure 8:
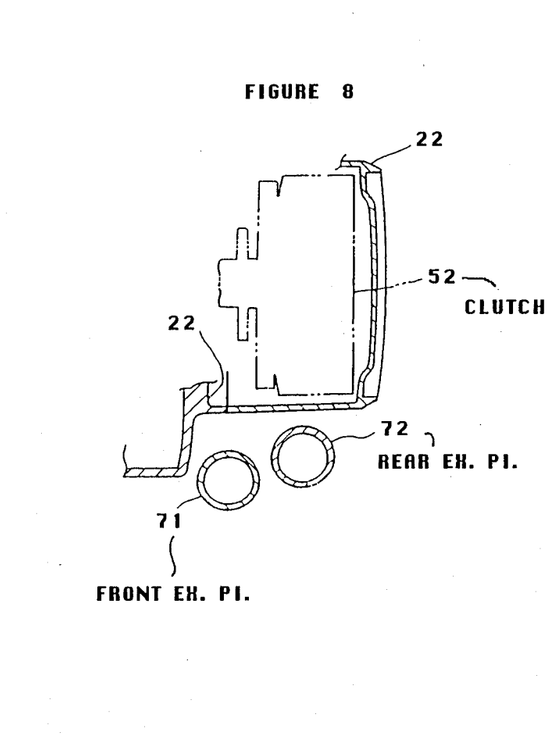
FIG. 8 is a cross-sectional view, on an enlarged scale, taken generally along the line 8—8 of FIG. 6.
Figure 9:
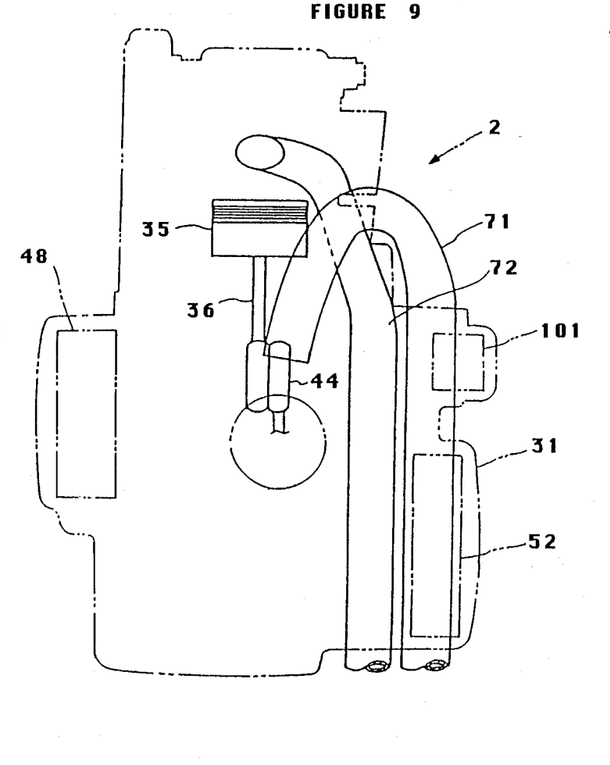
FIG. 9 is a partially schematic top plan view of the engine and its exhaust system of this embodiment.

Referring now to FIGS. 6 through 8, these figures show a second embodiment of the invention which is generally substantially similar to the embodiment of FIGS. 1 through 5. In this embodiment, however, the motorcycle is shown at the opposite side in FIG. 6 and also the relationship of the exhaust pipe 71 and 72 to the clutch is shown best in FIGS. 8 and 9. Because of the similarity of this embodiment of the previously described embodiment, those components which are the samehave been identified by the same reference numerals and will not be described again. FIG. 7 shows the offset t between the cylinder banks.

In this embodiment, the lubrication system is shown in more detail and in addition to the oil pump 67 there is provided an oil filter 101 that is disposed above the clutch assembly 52 so that it will be insulated from the heat of the exhaust system by the clutch assembly. The system also includes an oil cooler 102 that is mounted on the frame 12 above the cylinder bank 32. In all other regards, this embodiment is the same as that previously described and, for that reason, further description of it is not believed to be necessary.

In view of the foregoing, it should be readily apparent that the described embodiments of the invention provide a very compact yet well designed and well tuned exhaust system that provides substantially equal length for the exhaust pipes of the two angularly disposed cylinder banks and places the exhaust components away from critical components of the engine that should not be heated. Although two embodiments of the invention have been illustrated and described, various changes and modifications may be made without departing from the spirit and scope of the invention, as defined by the appended claims.

We claim:

1. An exhaust system for an engine having a crankcase and at least a pair of cylinders extending from said crankcase at an angle to each other, said cylinders being staggered transversely of said crankcase so that one of said cylinders is offset relative to the other of said cylinders, said cylinders having like facing exhaust ports, the improvement comprising a first exhaust pipe extending from the exhaust port of said offset cylinder downwardly and to one side of the other of said cylinders and passing at least in part under said crankcase, a second exhaust pipe extending from the exhaust port of the other of said cylinders and passing at least in part beneath said crankcase, and a common atmospheric exhaust gas discharge for said exhaust pipes.

2. An exhaust system as set forth in claim 1 wherein the first and second exhaust pipes have substantially the same length from the exhaust ports to their common atmospheric exhaust gas discharge.

3. An exhaust system as set forth in claim 1 further inncluding an accessory driven by the engine at one side thereof.

4. An exhaust system as set forth in claim 3 wherein the accessory is disposed on the opposite side of the engine from the exhaust pipes.

5. An exhaust system as set forth in claim 4 wherein the accessory is driven directly from one end of a crankshaft journaled in the crankcase and driven by the cylinders.

6. An exhaust system as set forth in claim 5 wherein the accessory comprises a generator.

7. An exhaust system as set forth in claim 3 wherein the accessory is positioned on the same side of the engine as the exhaust pipes.

8. An exhaust system as set forth in claim 7 wherein the accessory comprises a clutch.

9. An exhaust system as set forth in claim 8 wherein the engine further includes a lubricating system incorporating an oil filter and wherein the oil filter is disposed above the clutch so as to be protected by the clutch from the heat of the exhaust pipes.

10. An exhaust system as set forth in claim 1 in combination with a motorcycle wherein the cylinders are disposed one forwardly of the other in th motorcycle.

11. A motorcycle as set forth in claim 10 wherein the first and second exhaust pipes have substantially the same length from the exhaust ports to their common atmospheric exhaust gas discharge.

12. A motorcycle as set forth in claim 10 further including an accessory driven by the engine at one side thereof.

13. A motorcycle as set forth in claim 12 wherein the accessory is disposed on the opposite side of the engine from the exhaust pipes.

14. A motorcycle as set forth in claim 13 wherein the accessory is driven directly from one end of a crankshaft journaled in the crankcase and driven by the cylinders.

15. A motorcycle as set forth in claim 14 wherein the accessory comprises a generator.

16. A motorcycle as set forth in claim 12 wherein the accessory is positioned on the same side of the engine as the exhaust pipes.

17. A motorcycle as set forth in claim 16 wherein the accessory comprises a clutch.

18. A motorcycle as set forth in claim 17 wherein the engine further includes a lubricating system incorporating an oil filter and wherein the oil filter is disposed above the clutch so as to be protected by the clutch from the heat of the exhaust pipes.

19. An exhaust system for an engine having a crankcase containing a crankshaft and at least a pair of cylinders extending from said crankcase at an angle to each other, an accessory driven by said engine at one side thereof, said cylinders having like facing exhaust ports, the improvement comprising first and second exhaust pipes extending from the exhaust ports of said cylinders downwardly and to one side of the engine and passing at least in part beneath said crankcase and discharging to the atmosphere, said accessory being located at the opposite side of the engine from said exhaust ports.

20. An exhaust system as set forth in claim 19 wherein the accessory is driven directly from one end of a crankshaft journaled in the crankcase and driven by the cylinders.

21. An exhaust system as set forth in claim 20 wherein the accessory comprises a generator.

22. An exhaust system as set forth in claim 19 in combination with a motorcycle wherein the cylinders are disposed one forwardly of the other in the motorcycle.

23. A motorcycle as set forth in claim 22 wherein the accessory is driven directly from one end of a crankshaft journaled in the crankcase and driven by the cylinders.

24. An exhaust system as set forth in claim 23 wherein the accessory comprises a generator.

25. An exhaust system for an engine having a crankcase containing a crankshaft, a clutch disposed at one side of said engine and driven by said crankshaft, a pair of cylinders extending from said crankcase at an angle to each other, said cylinders having like facing exhaust ports, the improvement comprising first and second exhaust pipes extending from the exhaust ports of said cylinder downwardly and beneath said crankcase and said clutch and discharging to the atmosphere.

26. An exhaust system as set forth in claim 25 wherein the engine further includes a lubricating system incorporating an oil filter and wherein the oil filter is disposed above the clutch so as to be protected by the clutch from the heat of the exhaust pipes.

27. An exhaust system as set forth in claim 25 in combination with a motorcycle wherein the cylinders are disposed one forwardly of the other in the motorcycle.

28. A motorcycle as set forth in claim 27 wherein the engine further includes a lubricating system incorporating an oil filter and wherein the oil filter is disposed above the clutch so as to be protected by the clutch from the heat of the exhaust pipes.

* * * * *